United States Patent
Schauer et al.

(10) Patent No.: US 10,509,600 B2
(45) Date of Patent: Dec. 17, 2019

(54) METHOD AND APPARATUS FOR DATA COMPRESSION AND DECOMPRESSION USING A STANDARDIZED DATA STORAGE AND RETRIEVAL PROTOCOL

(71) Applicant: Goke US Research Laboratory, Santa Clara, CA (US)

(72) Inventors: Steven Schauer, Loveland, CO (US); Xinhai Kang, Milpitas, CA (US); Engling Yeo, San Jose, CA (US)

(73) Assignee: Goke US Research Laboratory, Santa Clara, CA (US)

( * ) Notice: Subject to any disclaimer, the term of this patent is extended or adjusted under 35 U.S.C. 154(b) by 0 days.

(21) Appl. No.: 15/973,379

(22) Filed: May 7, 2018

(65) Prior Publication Data

US 2019/0265914 A1 Aug. 29, 2019

Related U.S. Application Data

(63) Continuation-in-part of application No. 15/907,101, filed on Feb. 27, 2018.

(51) Int. Cl.
   *G06F 11/10* (2006.01)
   *G06F 3/06* (2006.01)
   *G06F 13/16* (2006.01)
   *G06F 13/42* (2006.01)

(52) U.S. Cl.
   CPC ........ *G06F 3/0661* (2013.01); *G06F 3/0608* (2013.01); *G06F 3/0679* (2013.01); *G06F 13/1668* (2013.01); *G06F 13/4282* (2013.01); *G06F 2213/0026* (2013.01)

(58) Field of Classification Search
   CPC ...... G06F 21/72; G06F 13/4282; G06F 21/76; G06F 21/79; G06F 2213/0026; H04L 9/0897
   See application file for complete search history.

(56) References Cited

U.S. PATENT DOCUMENTS

| 10,114,586 B1 * | 10/2018 | Benisty ................. G06F 3/0656 |
| 2014/0317219 A1 | 10/2014 | Fitch et al. |
| 2015/0058529 A1 | 2/2015 | Lin et al. |

(Continued)

FOREIGN PATENT DOCUMENTS

WO   WO 2016/186801 A1   11/2016

OTHER PUBLICATIONS

International Search Report, dated May 8, 2019, for corresponding International Application No. PCT/US2019/019682.

(Continued)

*Primary Examiner* — Idriss N Alrobaye
*Assistant Examiner* — Richard B Franklin
(74) *Attorney, Agent, or Firm* — Intellectual Property Law Group LLP (57) ABSTRACT

A system, method and apparatus for compressing and decompressing data. A host processor and host memory are coupled to a block I/O device. The host processor issues compress and decompress commands to the block I/O device in accordance with a high-speed data storage and retrieval protocol. The block I/O device compresses/decompresses the data specified in the compress/decompress command, thus relieving the host processor of performing the compression/decompression and freeing the host processor for other tasks.

17 Claims, 5 Drawing Sheets

(56) References Cited

U.S. PATENT DOCUMENTS

| | | | | |
|---|---|---|---|---|
| 2016/0094619 A1* | 3/2016 | Khan | ................... | H04L 67/10 |
| | | | | 709/203 |
| 2018/0011812 A1 | 1/2018 | Morishita et al. | | |
| 2018/0173441 A1* | 6/2018 | Cargnini | ............... | G06F 3/0619 |
| 2018/0321987 A1* | 11/2018 | Benisty | ................... | G06F 9/528 |

OTHER PUBLICATIONS

Written Opinion of the International Searching Authority, dated May 8, 2019, for corresponding International Application No. PCT/US2019/019682.

International Search Report, dated Apr. 22, 2019, for corresponding International Application No. PCT/US2019/019686.

Written Opinion of the International Searching Authority, dated Apr. 22, 2019, for corresponding International Application No. PCT/US2019/019686.

* cited by examiner

METHOD AND APPARATUS FOR DATA COMPRESSION AND DECOMPRESSION USING A STANDARDIZED DATA STORAGE AND RETRIEVAL PROTOCOL

I. REFERENCE TO RELATED APPLICATIONS

This application is a continuation-in-part of U.S. application Ser. No. 15/907,101, filed on Feb. 27, 2018, incorporated by reference in its entirety herein.

BACKGROUND

II. Field of Use

The present invention relates to the field of digital data storage and more specifically to data compression and decompression.

III. Description of the Related Art

Commercial mass data storage has become a vital part of the modern economy. Thousands of companies rely on secure, fault-proof data storage to serve their customers. Moreover, compression is becoming more important as data continues to grow exponentially.

Data storage in commercial settings typically provides for some form of data compression to maximize physical storage constraints. Compression also allows for faster transmission speed and bandwidth savings.

In some cases, the benefits of data compression are only evident if the compressed data of a variety of different compressed lengths can be packed together to fit a physical page. Thus, compression is more efficiently performed at the volume level by a host.

Compression may be lossy or lossless. Lossless compression reduces bits by identifying and eliminating statistical redundancy. Lossy compression reduces bits by removing unnecessary or less important information. An example of lossless compression is the well-known Lempel-Ziv-Welch algorithm, which dynamically constructs dictionary tables according to the input data. However, this, as most compression schemes, requires intense CPU and memory resources from a host processing system, which slows the system down for other applications.

Thus, it would be desirable to compress and decompress large amounts of data without taking computational resources from a host CPU.

SUMMARY

The embodiments described herein relate to an apparatus, system and method for compressing and decompressing data. In one embodiment, a block I/O device is described for performing data compression, comprising A block I/O device, configured to compress and decompress data, comprising, a controller configured to retrieve a compress command issued by a host processor, the controller coupled to the host processor and a host memory by a high-speed data bus, the compress command retrieved in accordance with a standardized data storage and retrieval protocol, to cause the data to be compressed in accordance with a compression algorithm, and to provide a completion queue entry into a completion queue upon completion of the compression, and a memory coupled to the controller for storing the compression algorithm to compress the data.

In another embodiment, a computer system for compressing data is described, comprising a host processor for generating a compress command and storing the compress command into a submission queue, the compress command comprising a modified version of a command defined by a standardized data storage and retrieval protocol, a host memory for processor-executable instructions, a data bus, a block I/O device electronically coupled to the host processor and the host memory by the data bus, the block I/O device comprising a controller configured to retrieve the compress command from a submission queue in accordance with the standardized data and retrieval protocol, to cause the data to be compressed in accordance with a compression algorithm, and to provide a completion queue entry into a completion queue upon completion of the compression, and a memory coupled to the controller for storing the compression algorithm used to compress the data, and for storing the submission queue and the completion queue.

In yet another embodiment, a method for compressing data, performed by a block I/O control device, is described, comprising generating, by a host processor, an compress command, the compress command comprising a modified version of a Vendor Specific Command as defined by an NVMe data storage and retrieval protocol, storing, by the host processor, the compress command in a submission queue, retrieving, by a controller in an I/O block device coupled to the host processor by a data bus, the compress command from the submission queue in accordance with the NVMe data storage and retrieval protocol, retrieving, by the controller, data from an input buffer coupled to the controller at an input buffer address identified by the modified version of the Vendor Specific Command, compressing the block of data in accordance with the compress command to generate compressed data, and storing, by the controller in a completion queue, a result of compressing the data.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Methods and apparatus are provided for compressing and decompressing data by a block I/O device coupled to a host processor and host memory via a high-speed data bus. The block I/O device performs compression and/or decompression on data stored in an input buffer of the I/O device in accordance with commands issued by the host processer using a standardized data storage and retrieval protocol. This architecture enables the host processor to delegate burdensome compression and decompression processing to the block I/O device, thus freeing up host processor resources for other tasks. This method is suitable for a scale-out architecture in which data may be compressed/decompressed in parallel by multiple block I/O devices, each coupled to the host processor via the high-speed data bus.

Figure 1:
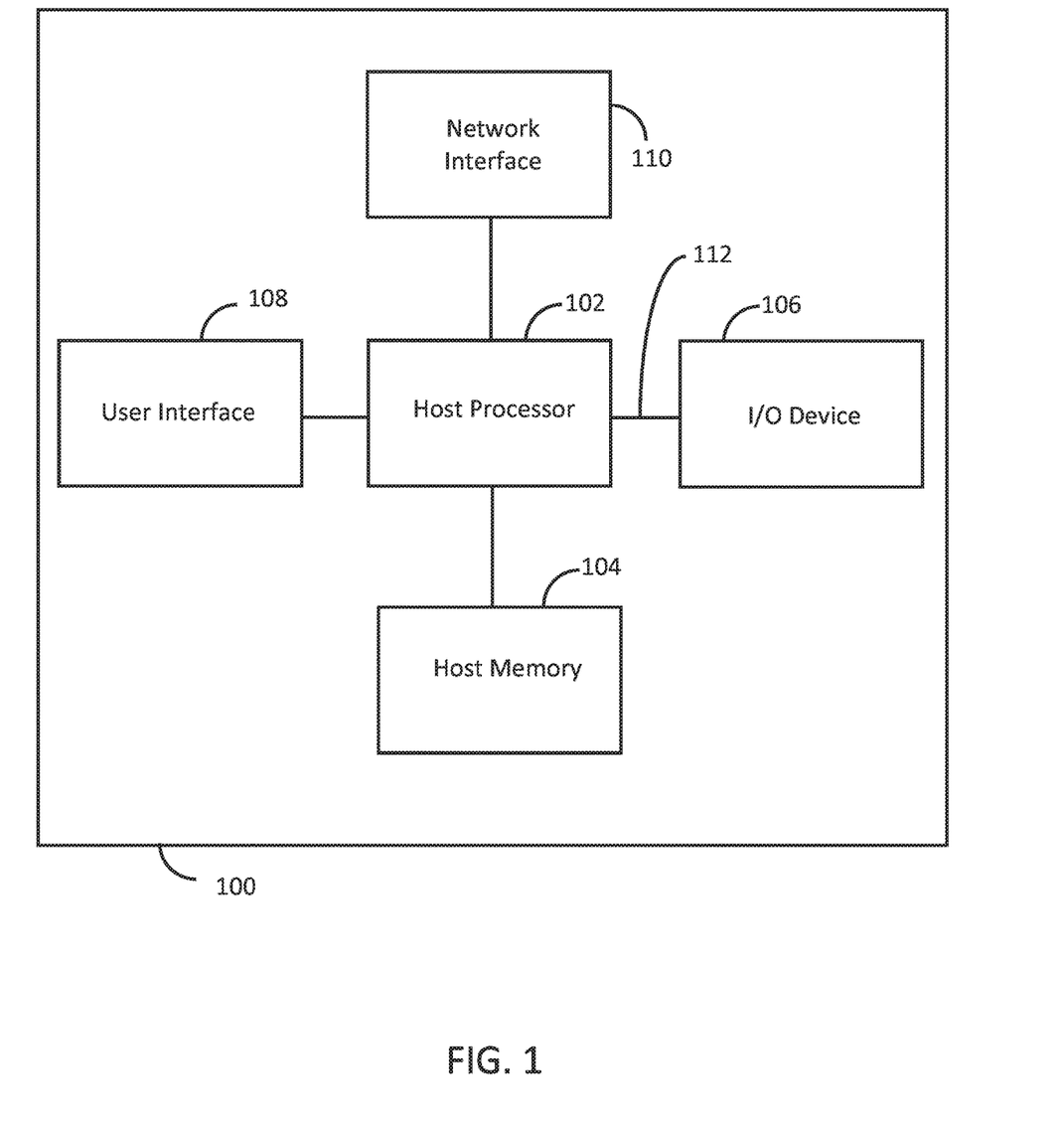
FIG. 1 illustrates a functional block diagram of one embodiment of a computer system utilizing the inventive concepts described herein.

FIG. 1 illustrates a functional block diagram of one embodiment of a computer system 100 using the inventive concepts described herein. Shown is computer system 100, comprising host processor 102, host memory 104, I/O device 106, user interface 108, and network interface 110. Host processor 102, host memory 104 and I/O device 106 are electronically coupled via data bus 112. I/O device typically comprises a connector that plugs into an expansion port on a motherboard of computer system 100.

Computer system 100 may comprise a personal computer or cloud-based server to perform a variety of tasks such as word processing, web browsing, email, web-hosting, and mass data storage and retrieval. Computer system 100 may comprise a server coupled to the Internet specifically configured to process data prior to storage and/or transmission, including data compression and/or decompression. In some embodiments, block I/O device 106 may comprise a large-capacity SSD for storing large volumes (1 terabyte or more) of data. In other embodiments, block I/O device 106 may comprise one or more Static Random Access Memories (SRAM), or DDR memory partitioned in such a manner as to allow host processor 102 to define one or more memory areas as a scratchpad/temporary storage buffer(s). The term "block" refers to a peripheral device that processes and/or stores data in addressable, fixed-sized blocks. In other embodiments, block I/O device is a specialized compression/decompression device (throughout this specification, it should be understood that the term "compression" typically also refers to decompression). The specialized block I/O compression/decompression device may be pre-configured with one or more compression/decompression algorithms and related parameters. In some embodiments, a compression algorithm index is used to associate a plurality of compression/decompression algorithms each with a respective compression/decompression algorithm index value (such as 1, 2, 3, 4 . . . ). In this way, host processor 102 may specify a particular compression algorithm for block I/O device to use without providing the compression algorithm itself to block I/O device 106 each time a block of data is sent to I/O device 106 for compression/decompression.

Computer system 100 may be used to compress data destined for transmission to remote locations or decompress compressed data received via network interface 110 from a wide-area data network, such as the Internet. In order to quickly compress or decompress large volumes of data, host processor 102 off-loads computationally-intensive compression/decompression activities to block I/O device 106.

Processor 102 is configured to provide general operation of computer system 100 by executing processor-executable instructions stored in host memory 104, for example, executable computer code. Processor 102 typically comprises a general purpose microprocessor or microcontroller manufactured by Intel Corporation of Santa Clara, Calif. or Advanced Micro Devices of Sunnyvale, Calif., selected based on computational speed, cost and other factors.

Host memory 104 comprises one or more non-transitory information storage devices, such as RAM, ROM, EEPROM, UVPROM, flash memory, SD memory, XD memory, or other type of electronic, optical, or mechanical memory device. Host memory 104 is used to store processor-executable instructions for operation of computer system 100, and may additionally be used to store data destined for compression, compressed/decompressed data, a compression algorithm index, one or more submission queues, one or more completion queues, and one or more administrative submission queues (such queues will be explained in more detail later herein). It should be understood that in some embodiments, a portion of host memory 104 may be embedded into processor 102 and, further, that host memory 104 excludes media for propagating signals.

Data bus 112 comprises a high-speed command and data interface between host processor 102 and peripheral devices such as block I/O device 106. In one embodiment, data bus 112 conforms to the well-known Peripheral Component Interconnect Express, or PCIe, standard. PCIe is a high-speed serial computer expansion bus standard designed to replace older PCI, PCI-X, and AGP bus standards. Data bus 112 is configured to allow high-speed data transfer between host processor 102 and I/O device 106, such as data storage and retrieval, but may also transport configuration information, operational instructions and related parameters for processing by I/O device 106 as described in greater detail later herein. Data bus 112 may comprise a multi-strand data cable or be embedded into a motherboard of computer system 100.

Figure 2:
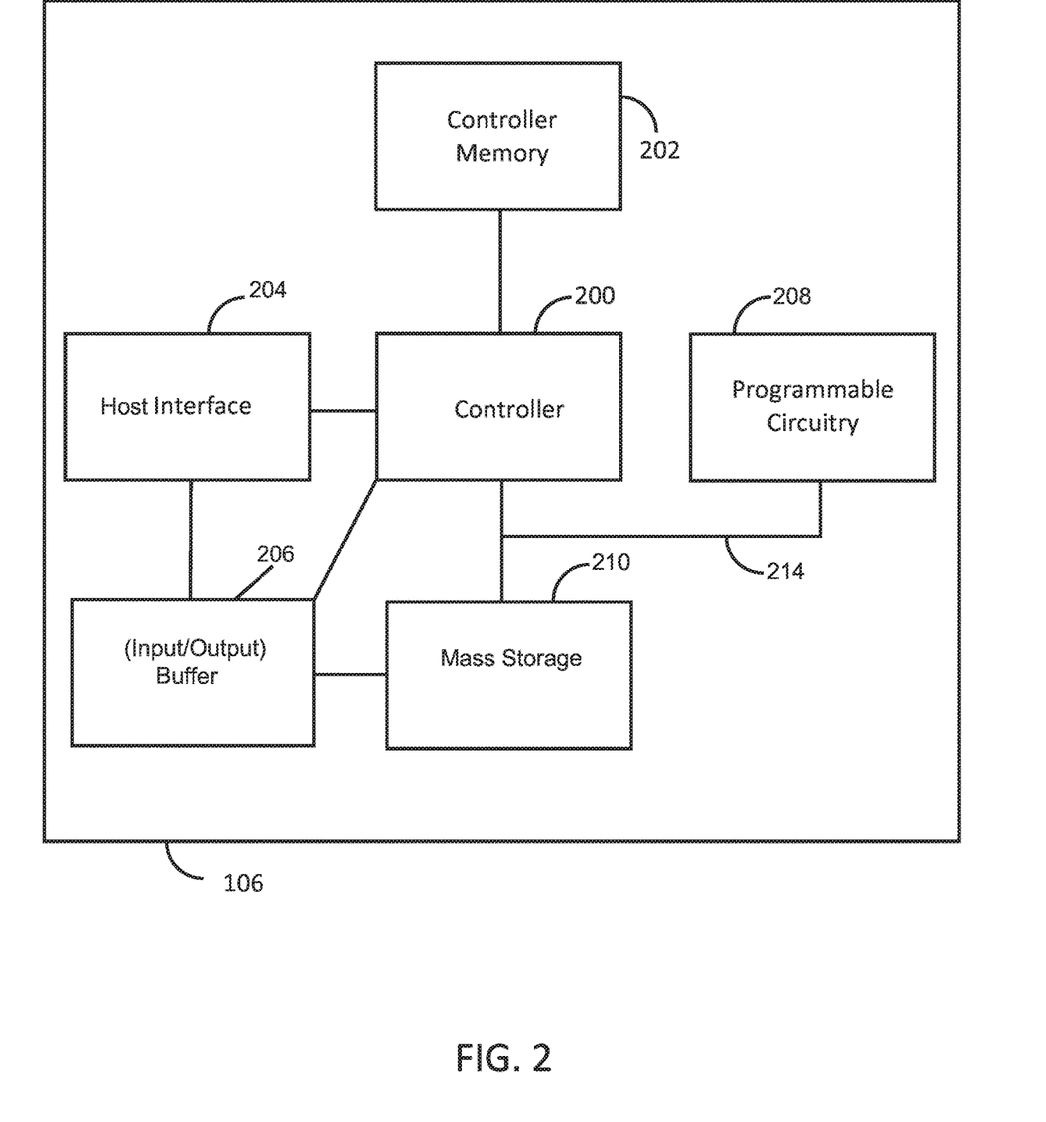
FIG. 2 is a functional block diagram of a block I/O device as shown in FIG. 1.

Block I/O device 106 comprises an internal or external peripheral device coupled to processor 102 and host memory 104 via data bus 112. As shown in FIG. 2, block I/O device 106 comprises a controller 200, a controller memory 202, and a host interface 204. In some embodiments, block I/O device additionally comprises buffer 206, programmable circuitry 208 and/or mass storage 210. Host processor 102 communicates with controller 200 via data bus 112 and host interface 204, which comprises circuitry well known in the art for providing a command and data interface between block I/O device 106 and data bus 112 (in other embodiments, host interface 204 is incorporated into controller 200). Block I/O device 106 may be configured to compress data arranged in "blocks", each sometimes referred to as a physical record, is a sequence of bytes or bits, usually containing some whole number of records, having a maximum length, a block size. In one embodiment, the well-known NVMe data storage and retrieval protocol is used to provide communications between block I/O device 106 and host processor 102 and host memory 104. The NVMe protocol defines both a register-level interface and a command protocol used by host processor 102 to communicate with NVMe-compliant devices. In one embodiment, block I/O device 106 is configured to be NVMe compliant.

In one embodiment, block I/O device 106 comprises a high-capacity SSD, such as a 1 Terabyte, 16-Channel ONFI-compliant NAND SSD with an 800 MBps NVMe interface. In this embodiment, block I/O device comprises a number of mass storage 210 devices in the form of a number of NAND flash memory chips, arranged in a series of banks and channels to store one or more terabytes of compressed data. In this embodiment, block I/O device 106 performs data storage and retrieval in accordance with the NVMe protocol, and also performs compression prior to storage (and decompression upon data retrieval), in accordance with one or more modified Vendor Specific Commands defined under the NVMe protocol. Embodiments of the present invention define one or more commands to compress and decompress blocks of data, based on the Vendor Specific Command, as described later herein.

Controller 200 comprises one or more custom ASICs, PGAs, and/or peripheral circuitry to perform the functionality of block I/O device 106. Such circuitry is well-known in the art.

Controller memory 202 comprises one or more non-transitory information storage devices, such as RAM, ROM, EEPROM, flash memory, SD memory, XD memory, or other type of electronic, optical, or mechanical memory device. Controller memory 202 is used to store processor-executable instructions for operation of controller 200, as well as one or more compression algorithms in an compression algorithm index. In some embodiments, controller memory 202 is also used to store one or more submission queues, one or more completion queues, and/or one or more administrative submission and completion queues. It should be understood that in some embodiments, controller memory 202 is incorporated into controller 200 and, further, that controller memory 202 excludes media for propagating signals.

Host interface 204 comprises circuitry and firmware to support a physical connection and logical emulation to host processor 102 and host memory 104. Such circuitry is well-known in the art.

Input/Output buffer 206 comprises one or more data storage devices for providing temporary storage for data awaiting compression or decompression and/or data that has been compressed/decompressed. Buffer 206 typically comprises RAM memory for fast access to the data. In one embodiment, buffer 206 comprises both an input buffer for temporary storage of uncompressed data prior to compression and/or compressed data prior to decompression, and an output buffer for temporary storage of compressed data after compression or decompressed data after decompression. The location and sizes of the buffers are determined in accordance with, in one embodiment, the NVMe protocol.

Programmable circuitry 208 comprises a programmable integrated circuit, such as an embedded FPGA, embedded video processor, a tensor processor, or the like, which typically comprises a large quantity of configurable logic gate arrays, one or more processors, I/O logic, and one or more memory devices. Programmable circuitry 208 offers configurability to implement one or more compression and/or decompression algorithms, including both lossy and lossless compression techniques, such as various forms of the well-known JPEG technique, the Lempel-Ziv-Welch technique, and many others. Programmable circuitry 208 may be configured by host processor 102 via controller 200 over data bus 112, using a high-speed data protocol normally used to store and retrieve data with block I/O device 106. Programmable circuitry 208 may be coupled to controller 200 via bus 214, connected to the same data and control lines used by controller 200 to store and retrieve data in mass storage 210, in an embodiment that utilizes such mass storage, as programmable circuitry 208 typically comprises a number of bidirectional I/O data lines, a write enable and a read enable, among others. It should be understood that in other embodiments, programmable circuitry could be incorporated into controller 200. In these embodiments, programmable circuitry 208 may still utilize the same data and control lines used to store and retrieve data from mass storage 210.

Mass storage 210 comprises one or more non-transitory information storage devices, such as RAM memory, flash memory, SD memory, XD memory, or other type of electronic, optical, or mechanical memory device, used to store compressed or decompressed data. In one embodiment, mass storage 210 comprises a number of NAND flash memory chips, arranged in a series of banks and channels to provide up to multiple terabytes of data. Mass storage 210 is electronically coupled to controller 200 via a number of data and control lines, shown as bus 214 in FIG. 2. For example, bus 214 may comprise a number of bidirectional I/O data lines, a write enable and a read enable, among others. Mass storage 210 excludes media for propagating signals.

Figure 3:
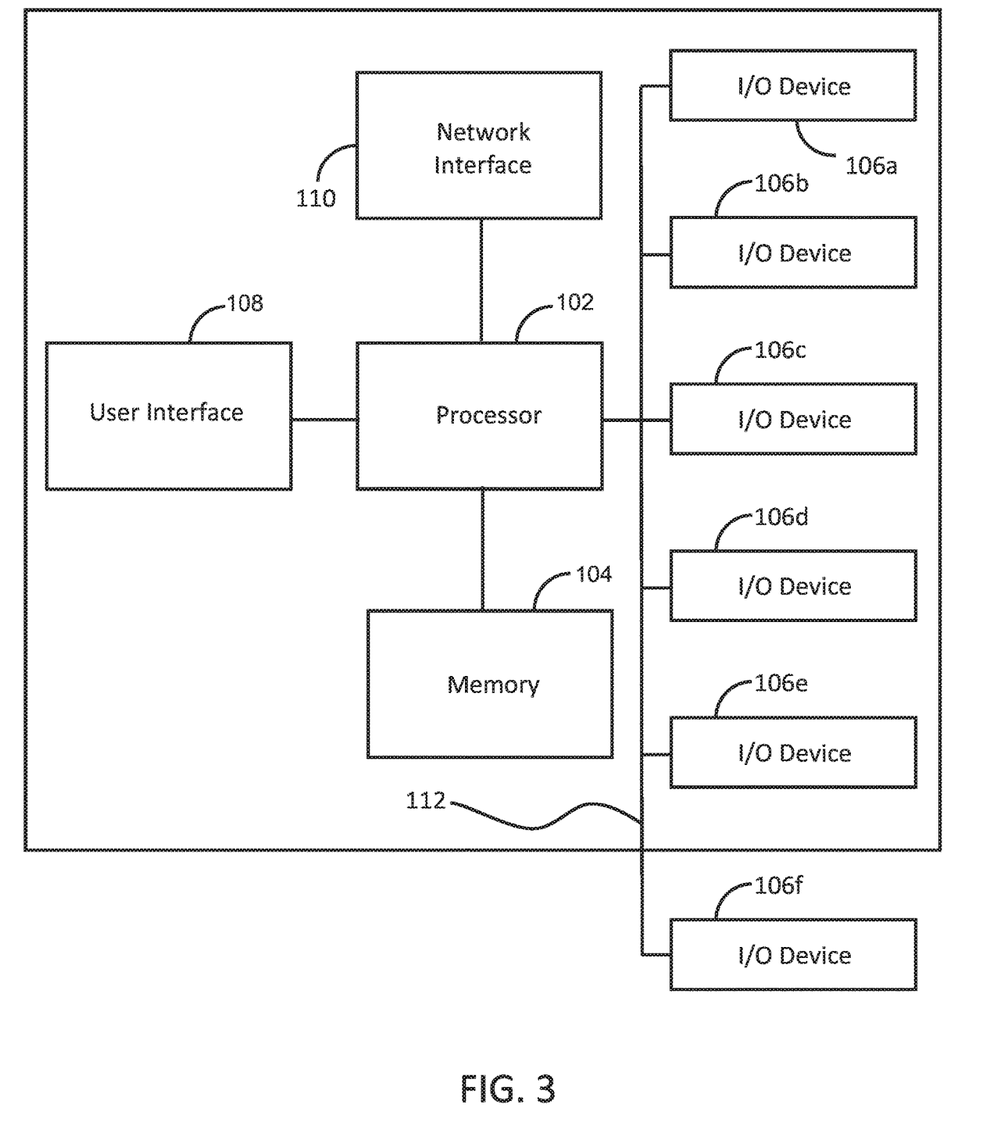
FIG. 3 is another embodiment of the computer system shown in FIG. 1 having multiple block I/O devices.

FIG. 3 is another embodiment of computer system 100, showing five internal block devices 106a-106e, each mechanically coupled to a motherboard of computer system 100 (not shown) and electrically coupled to host processor 102 and host memory 104 via data bus 112. Additionally, block I/O device 106f is externally coupled to data bus 112 via a cable typically comprising a number of power, ground and signal wires and having a connector on each end that interfaces to the motherboard and an external connector on I/O device 106f (not shown). In this embodiment, one or more of the block I/O devices can compress data in accordance with commands from host processor 102. Host processor 102 may compress a large amount of data by assigning two or more of the block I/O devices to compress the data, either in parallel or serially. In one embodiment, after compression, data is immediately stored in host memory 104, where in other embodiments where the block I/O devices comprise mass storage capabilities, the compressed data is stored by each block I/O device, respectively.

Figure 4A:
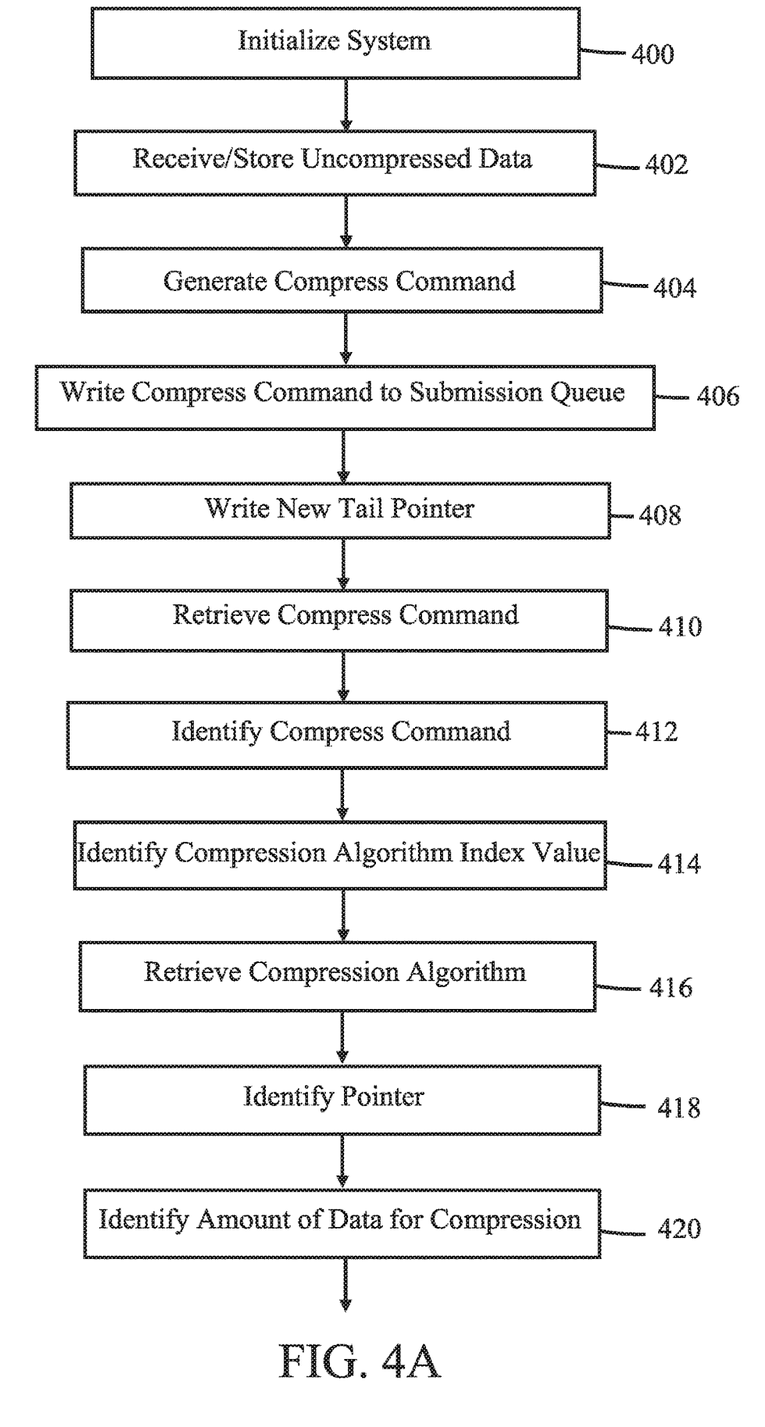
FIGS. 4A and 4B are flow diagrams illustrating one embodiment of a method performed by a host processor and an I/O device as shown in FIG. 1.
Figure 4B:
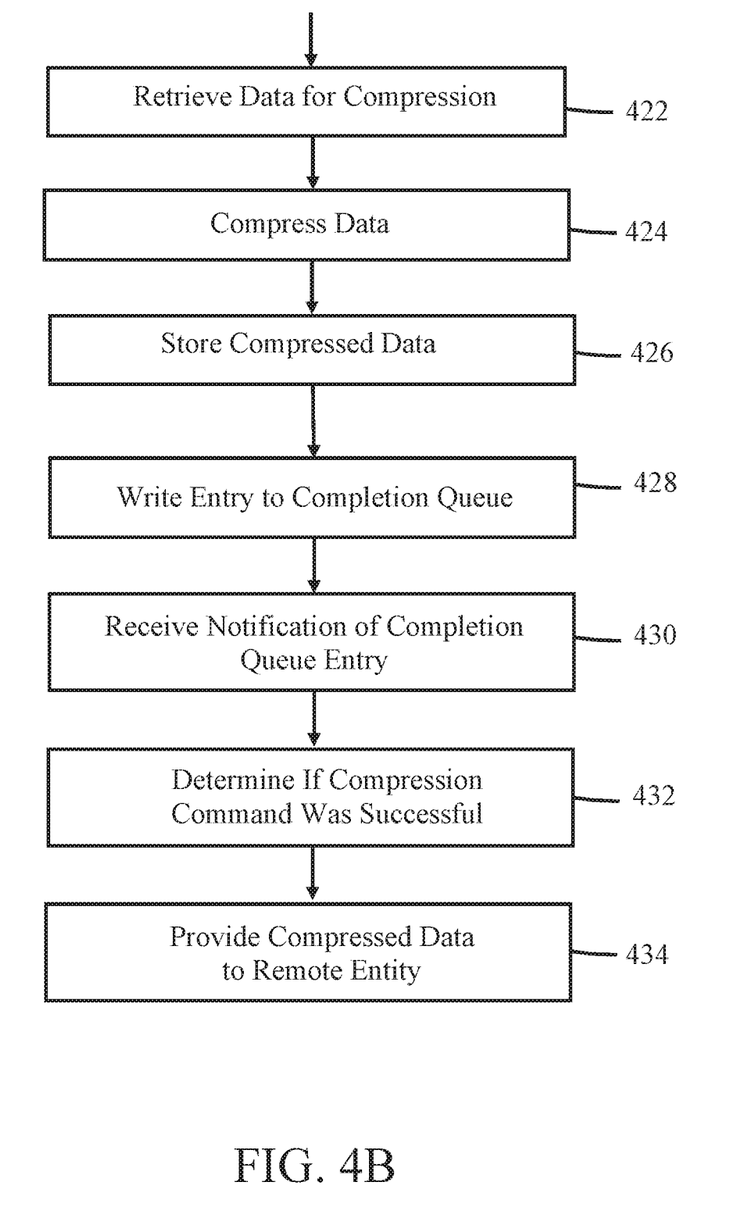

FIGS. 4A and 4B are flow diagrams illustrating one embodiment of a method performed by host processor 102 and I/O device 106 to compress data. The method is implemented by host processor 102 and controller 200, executing processor-executable instructions stored in host memory 104 and controller memory 202, respectively. It should be understood that in some embodiments, not all of the steps shown in FIGS. 4A and 4B are performed and that the order in which the steps are carried out may be different in other embodiments. It should be further understood that some minor method steps have been omitted for purposes of clarity.

The method is described in reference to the well-known NVM Express protocol (NVMe) over a computer's PCIe bus, which allows host processor 102 to control block I/O device 106 to perform compression and decompression and, in some embodiments, to store and retrieve compressed or decompressed data.

NVMe is a storage interface specification normally used for Solid State Drives (SSDs) on a PCIe bus. The latest version of the NVMe specification can be found at www.nvmexpress.org, presently version 1.3, dated May 1, 2017, and is incorporated by reference in its entirety herein. Compression and decompression commands are provided in the form of modified Vendor Specific Commands, where a format for Vendor Specific Commands is defined by the NVMe protocol and shown below:

Command Format - Admin and NVM Vendor Specific Commands

| Bytes | Description |
|---|---|
| 03:00 | Command Dword 0 (CDW0): This field is common to all commands and is defined in FIG. 10. |
| 07:04 | Namespace Identifier (NSID): This field indicates the namespace ID that this command applies to. If the namespace ID is not used for the command, then this field shall be cleared to 0h. Setting |

Command Format - Admin and NVM Vendor Specific Commands

| Bytes | Description |
|---|---|
| | this value to FFFFFFFFh causes the command to be applied to all namespaces attached to this controller, unless otherwise specified. |
| | The behavior of a controller in response to an inactive namespace ID for a vendor specific command is vendor specific. Specifying an invalid namespace ID in a command that uses the namespace ID shall cause the controller to abort the command with status Invalid Namespace or Format, unless otherwise specified. |
| 15:08 | Reserved |
| 39:16 | Refer to FIG. 11 for the definition of these fields. |
| 43:40 | Number of Dwords in Data Transfer (NDT): This field indicates the number of Dwords in the data transfer. |
| 47:44 | Number of Dwords in Metadata Transfer (NDM): This field indicates the number of Dwords in the metadata transfer. |
| 51:48 | Command Dword 12 (CDW12): This field is command specific Dword 12. |
| 55:52 | Command Dword 13 (CDW13): This field is command specific Dword 13. |
| 59:56 | Command Dword 14 (CDW14): This field is command specific Dword 14. |
| 63:60 | Command Dword 15 (CDW15): This field is command specific Dword 15. |

Both administrative and I/O Vendor Specific Commands may defined.

In one embodiment, a modified version of the Vendor Specific Command is defined to cause block I/O device 106 to compress data. This "compress command" (and, similarly, a decompress command) is shown below:

| Bytes | Description |
|---|---|
| 03:00 | Command Dword 0 (CDW0): This field is common to all commands and is defined in FIG. 10. |
| 07:04 | Namespace Identifier (NSID): This field indicates a Namespace ID, used to identify a Compression/Decompression algorithm index value. |
| 15:08 | Reserved |
| 39:16 | Refer to FIG. 11 for the definition of these fields. |
| 43:40 | Number of Dwords in Data Transfer (NDT): This field indicates the number of Dwords in a data transfer (i.e., amount of data to be compressed/decompressed). |
| 47:44 | Number of Dwords in Metadata Transfer (NDM): This field indicates the number of Dwords in a metadata transfer. |
| 51:48 | Command Dword 12: Compress/Decompress Data Pointer: This field specifies the address in memory where compressed/decompressed data is to be transferred. ($1^{st}$ 4 bytes) |
| 55:52 | Command Dword 13: Compress/Decompress Data Pointer: This field specifies the address in memory where compressed/decompressed data is to be transferred. ($2^{nd}$ 4 bytes) |
| 59:56 | Command Dword 14: Compress/Decompress Data Pointer: This field specifies the address in memory where compressed/decompressed data is to be transferred. ($3^{rd}$ 4 bytes) |
| 63:60 | Command Dword 15: Compress/Decompress Data Pointer: This field specifies the address in memory where compressed/decompressed data is to be transferred. ($4^{th}$ 4 bytes) |

In one embodiment, each modified, Vendor Specific Command is 64 bytes long, comprising Command Dword 0, a Namespace Identifier field, a reserved field, a Metadata pointer, a Data pointer, a Number of Dwords in Data Transfer field, a Number of Dwords in Metadata Transfer field, and 4 command Dwords. It should be understood that in other embodiments, a different arrangement of the fields and the number of bits per field could be different than what is described in this embodiment. Each Dword, in this example, is four bytes.

A definition of this modified, Vendor Specific Command is stored in host memory 104 and in controller memory 202 for use by host processor 102 and controller 200, respectively.

At block 400, processor 102 and controller 200 cooperate with each other to determine a number of initial settings, such as one or more particular compression algorithms, parameters for use of the one or more compression algorithms, a compression algorithm index associating the one or more compression algorithms each with a respective compression algorithm index value, a number of submission queues, completion queues, and memory allocations, and/or to allocate physical memory to a number of Namespace IDs.

A number of Submission queues and Completion queues (both Admin and I/O) may also be determined by processor 102 and/or controller 200, defining a number of each queue, a memory location for each queue and a size for each queue. The location of each queue may be defined by a particular physical memory (i.e., host memory 104, controller memory 202, and/or input/output buffer 206), and a memory address. Initialization of these queues is described in the NVMe specification, version 1.3.

Memory allocation may also be determined by processor 102 and controller 200. For example, an input buffer may be defined as part of buffer 206 located in block I/O device 106 for use by host processor 102 to temporarily store data destined for compression or decompression. An output buffer may also be defined as a portion of buffer 206 used to temporarily store compressed or decompressed data. Associated buffer sizes and memory addresses may also defined at this time. Such memory allocation is also described by the NVMe specification.

Memory allocation may additionally comprise defining a number of Namespace IDs, each Namespace ID identifying an area of physical memory (a "namespace"), used by processor 102 and controller 200 to logically separate and manage user data. The physical memory might comprise host memory 104, controller memory 202 and/or input/ output buffer 206, or some other information storage device, or portion thereof, located remotely from computer system 100 and accessed via network interface 110.

At block 402, processor 102 receives data to be compressed or decompressed, for example, a large text, image or video file from network interface 110 or from user interface 108. Processor 102 stores the data in host memory 104, or in input buffer 206, in one embodiment, as a number of logical blocks. In an embodiment where the data is stored in input buffer 206, the data may be transferred to input buffer 206 using one of a variety of data transfer protocols, such as PCIe. Host interface 204 may be used to aid in the transfer of data.

At block 404, processor 102 generates a compression command in accordance with the modified Vendor Specific Command, comprising, in this embodiment, 64 bytes. The compression command comprises Dword 0, representing an "operation code" or "op code", occupying bytes 0-3 of the compression command. In this embodiment, Dword 0 comprises 4 bytes with a value of A3 (hex), comprising a generic command field with a value of 1 (bit), a function field with a value of 010 00 (bits) and a data transfer field with a value of 11 (bit), similar to other opcodes as defined in FIG. 8 of the NVMe protocol. As an example, the following table summarizes an opcodes for compressing and decompressing data:

| Opcode by Field | | | | | | |
|---|---|---|---|---|---|---|
| (07) Generic Command | (06:02) Function | (01:00) Data Transfer | Combined Opcode | Optional/ Mandatory | Namespace Identifier Used | Command |
| 1b | 010 00b | 11b | A3h | M | No | Compress Data |
| 1b | 010 001 | 11b | A7h | M | No | Decompress Data |

The compression command additionally comprises a Namespace Identification field or Namespace ID field. In one embodiment, this field is 4 bytes long, occupying bytes 4-7 in the compression command. The Namespace ID field is used to identify a quantity of non-volatile memory that may be formatted into logical blocks. For example, sixteen Namespace IDs can be defined, each assigned by controller 200 for use by a particular user. Controller 200 additionally associates each Namespace ID with a portion of a physical memory. In this way, users may only access one portion of the hard drive that has been allocated to each of them. Then, as requests to compress and decompress data are received by processor 102, processor 102 formulates an compression/decompression command, inserting a Namespace ID into the Namespace ID field in association with the user who submitted a request.

In one embodiment, the Namespace ID is additionally used by controller 200 to identity a compression algorithm index value, representing a particular compression algorithm for use in compressing/decompressing data. Two or more compression algorithm index values, along with an identification of their respective compression algorithms, are stored in association as a compression algorithm index that may be pre-stored in host memory 104 and in controller memory 202. Each compression algorithm index value is associated with a particular compression algorithm used in connection with an compression algorithm that is executed by block I/O device 106. In operation, processor 102 determines a Namespace ID associated with data to be compressed and inserts that Namespace ID into the Namespace ID field of the compression/decompression command, representing a compression algorithm index value for compression/decompression. Block I/O device 106 then compresses or decompresses data using a compression algorithm associated with the compression algorithm index value.

In some embodiments, a number of compression/decompression algorithms may be defined, differing only by certain parameters, such as a data compression ratio, how they encode their compressed data to vary the numerical ranges of a length-distance pair, alter the number of bits consumed for a length-distance pair, distinguish their length-distance pairs from literals (raw data encoded as itself, rather than as part of a length-distance pair), etc. For example, a first compression algorithm may be defined as a Lempel-Ziv-Welch algorithm has a compression ratio of 5:1, assigned a compression algorithm index value of "1", while a second compression algorithm may be defined as a Lempel-Ziv-Welch algorithm has a compression ratio of 7:1, assigned a compression algorithm index value of "2".

Bytes 8-15 of the compression command are reserved for future uses by the NVMe protocol, so processor 102 does not typically assign any value to these bytes.

Bytes 16-23 of the compression command are used as a pointer to metadata that may be associated with the data stored in host memory 104. Processor 102 does not typically assign any value to these bytes.

Bytes 24-39 of the compression command are used as a pointer to the data in host memory 104 or input/output buffer 206 targeted for compression/decompression by the compression/decompression command.

Bytes 40-43 indicate a number of Dwords (amount of data) stored in host memory 104 or input/output buffer 206 destined for compression/decompression by the compression/decompression command.

Bytes 44-47 indicate a number of Dwords in a transfer of metadata from host memory 104 to block I/O device. However, in one embodiment, metadata is typically not used in the data compression process.

Bytes 48-63 comprises Dwords 12-15, each Dword 4 bytes long. Dwords 12-15 are combined to form a sixteen-byte address in host memory 104 or input/output buffer 206 where compressed/decompressed data should be stored.

At block 406, host processor 102 writes the compression command to a submission queue stored by host memory 104 or memory 202. The submission queue is a circular buffer with a fixed slot size that host processor 102 uses to submit commands for execution by controller 200. NVMe is based on a paired Submission and Completion Queue mechanism. Commands are placed by host processor 102 into a Submission Queue and completions by controller 200 are placed into an associated Completion Queue. Multiple Submission Queues may utilize the same Completion Queue. Submission and Completion Queues are allocated by host processor 102 and controller 200 in host memory 104 and/or in controller memory 202, as described earlier herein. An Admin Submission Queue (and associated Completion Queue) may exist for purposes of management and control (e.g., creation and deletion of I/O Submission and Completion Queues, aborting commands, programming programmable circuitry 208, providing compression algorithms to block I/O device 106, etc.).

defines two opcodes used to identify custom Admin Vendor Specific Commands to configure programmable circuitry 208 to execute a given compression algorithm:

| Opcode by Field | | | | | | |
|---|---|---|---|---|---|---|
| (07) Generic Command | (06:02) Function | (01:00) Data Transfer | Combined Opcode | Optional/ Mandatory | Namespace Identifier Used | Command |
| 1b | 001 00b | 00b | 90h | M | No | Compression Algorithm Download |
| 1b | 001 01 | 00 | 94h | M | No | Compression Algorithm Commit |

At block 408, in response to writing the compression command to the submission queue, host processor 102 writes a new tail pointer to a hardware doorbell register associated with the submission queue that alerts controller 200 that a command is available for execution in the submission queue.

At block 410, controller 200 retrieves the compression command from the submission queue over data bus 112 in accordance with the NVMe protocol.

At block 412, controller 200 identifies and validates the compression command as a command to compress data by comparing the opcode in bytes 0-3 to a list of opcodes stored in controller memory 202.

At block 414, controller 200 identifies and validates a compression algorithm index value as the Namespace ID stored in the Namespace ID field (i.e., bytes 4-7 of the compression command).

At block 416, in response to identifying the compression algorithm index value, controller 200 retrieves a compression algorithm associated with the compression algorithm index value from an compression algorithm index stored in controller memory 202.

At block 418, controller 200 identifies a pointer in the compression command (i.e., bytes 24-39), pointing to a starting address in host memory 104 or input/output buffer 206 of an amount of data to be compressed or decompressed. In one embodiment, the amount of data to be compressed or decompressed comprises a number of blocks of data.

At block 420, controller 200 identifies a number of Dwords stored in host memory 104 or input/output buffer 206 to be compressed/decompressed.

At block 422, controller 200 retrieves the amount of data from host memory 104 or input/output buffer 206, starting at the address provided by the pointer. Host interface 204 may be used to aid in the transfer of data, and the data may be stored temporarily in input/output buffer 206.

At block 424, controller 200 compresses the data that was retrieved at block 420, using the compression algorithm that was retrieved at block 416. In one embodiment, controller 200 performs the compression, using a compression algorithm stored in controller memory 202. In another embodiment, programmable circuitry 208 is used to compress/decompress the data. In this embodiment, programmable circuitry 208 is programmed by host processor 102 over data bus 112 using an Admin Vendor Specific Command.

The Admin Vendor Specific Command is an administrative command that utilizes the format of the Vendor Specific Command described by FIG. 12 in the NVMe specification. In the case where programmable circuitry 208 comprises an FPGA, host processor 102 provides configuration information to controller 200 for controller 200 to manipulate internal link sets of the FPGA in order to execute the compression algorithm. As an example, the following table In this example, a Compression Algorithm Download command of 90h is defined to instruct controller 200 to retrieve instructions from host memory 104 for configuring programmable circuitry 208 to perform a particular compression algorithm, and the Compression Algorithm Commit command of 94h causes controller 200 to activate the particular compression algorithm. The instructions to configure programmable circuitry 208 are retrieved by controller 200 over data bus 112 in accordance with the NVMe data storage and retrieval protocol. Controller 200 then configures programmable circuitry with the instructions that cause programmable circuitry 208 to execute the particular compression algorithm identified by the Admin Compression Algorithm Download command.

At block 426, after the data has been compressed, controller 200 stores the compressed data in host memory 104 or in input/output buffer 206, beginning at an address specified in the compression command, i.e., Dwords 12-15 at bytes 48-63 in the compression command. In another embodiment, controller 200 stores the compressed data in mass storage 210 for later retrieval by host processor 102.

At block 428, controller 200 writes a completion queue entry into a Completion Queue typically stored in host memory 104, indicating successful or unsuccessful completion of the compression/decompression command. The NVMe specification defines a Completion Queue as a circular buffer with a fixed slot size used to post status for completed commands. A Completion Queue Head pointer is updated by host processor 102 after it has processed Completion Queue entries indicating a last free Completion Queue slot. A Phase Tag (P) bit is defined in the completion queue entry to indicate whether an entry has been newly posted without consulting a register. This enables host processor 102 to determine whether the new entry was posted as part of a previous or current round of completion notifications. Specifically, controller 200 inverts the Phase Tab bit each time that a round of updates through the Completion Queue entries is completed.

At block 430, host processor 102 receives notification of the presence of an entry into the Completion Queue in accordance with the NVMe protocol. In one embodiment, a completion interrupt may be generated, such as a legacy, MSI, or MSI-X interrupt.

At block 432, host processor 102 determines if the compression command was successful or not by evaluating the completion queue entry. Processor 102 may compress large amounts of data by providing additional compression commands to block I/O device 106 in parallel, using up to 64 k Submission Queues and up to 64 k completion queues. Each queue is capable of storing up to 64 k commands. Thus, a large volume of data may be compressed without consuming excessive host processor resources.

At block 434, host processor 102 may provide the compressed/decompressed data from host memory 104 or input/output buffer 206 as identified by a memory address defined by Dwords 12-15 of the compression/decompression command, to a remote location over network interface 110 via a wide-area network.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

It is to be understood that the decoding apparatus and methods described herein may also be used in other communication situations and are not limited to RAID storage. For example, compact disk technology also uses erasure and error-correcting codes to handle the problem of scratched disks and would benefit from the use of the techniques described herein. As another example, satellite systems may use erasure codes in order to trade off power requirements for transmission, purposefully allowing for more errors by reducing power and chain reaction coding would be useful in that application. Also, erasure codes may be used in wired and wireless communication networks, such as mobile telephone/data networks, local-area networks, or the Internet. Embodiments of the current invention may, therefore, prove useful in other applications such as the above examples, where codes are used to handle the problems of potentially lossy or erroneous data.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A block I/O device, configured to compress and decompress data, comprising:
a controller configured to retrieve a compress command issued by a host processor, the controller coupled to the host processor and a host memory by a high-speed data bus, the compress command retrieved in accordance with a standardized data storage and retrieval protocol, to cause the data to be compressed in accordance with a compression algorithm, and to provide a completion queue entry into a completion queue upon completion of the compression; and
a memory coupled to the controller for storing the compression algorithm to compress the data;
wherein the memory further stores a compression algorithm index, the compression algorithm index for associating one or more compression algorithms stored in the memory with one or more compression algorithm index values, respectively, wherein the controller is configured to cause the data to be compressed using a first compression algorithm identified in the compression algorithm index in accordance with a first compression algorithm index value specified by the compress command.

2. The block I/O device of claim 1, wherein the data bus comprises a PCIe bus, and the standardized data storage and retrieval protocol comprises an NVMe protocol.

3. The block I/O device of claim 1, further comprising:
an input buffer coupled to the controller;
wherein the controller is configured to cause the data to be compressed by retrieving one or more blocks of the data from the input buffer at an address in the input buffer specified by the compress command.

4. The block I/O device of claim 1, further comprising:
an output buffer coupled to the controller;
wherein the controller is configured to store the compressed data in the output buffer beginning at an address in the output buffer specified by the compress command.

5. The block I/O device of claim 1, wherein the data bus comprises a PCIe bus, and the standardized data storage and retrieval protocol comprises an NVMe protocol, wherein the first compression algorithm index value is provided by the host processor in a Namespace ID field of a Vendor Specific Command.

6. The block I/O device of claim 1, further comprising:
programmable circuitry for compressing the data in accordance with the compression algorithm, the programmable circuitry programmed by the controller in response to the controller retrieving an administrative command from an administrative submission queue in accordance with the data storage and retrieval protocol.

7. The block I/O device of claim 6, wherein the programmable circuitry comprises an embedded FPGA.

8. A computer system for compressing data, comprising:
a host processor for generating an compress command and storing the compress command into a submission queue, the compress command comprising a modified version of a command defined by a standardized data storage and retrieval protocol;
a host memory for processor-executable instructions;
a data bus;
a block I/O device electronically coupled to the host processor and the host memory by the data bus, the block I/O device comprising:
a controller configured to retrieve the compress command from the submission queue in accordance with the standardized data storage and retrieval protocol, to cause the data to be compressed in accordance with a compression algorithm, and to provide a completion queue entry into a completion queue upon completion of the compression; and
a memory coupled to the controller for storing the compression algorithm used to compress the data, and for storing the submission queue and the completion queue;

wherein the memory further stores a compression algorithm index, the compression algorithm index for associating one or more compression algorithms stored in the memory with one or more compression algorithm index values, respectively, wherein the controller is configured to cause the data to be compressed using a first compression algorithm in the compression algorithm index in accordance with a first compression algorithm index value specified by the compress command.

9. The computer system of claim 8, wherein the data bus comprises a PCIe bus, and the standardized data storage and retrieval protocol comprises an NVMe protocol.

10. The computer system of claim 8, wherein the block I/O device further comprises:
    an input buffer coupled to the controller;
    wherein the controller is configured to cause the data to be compressed by retrieving one or more blocks of the data from the input buffer at an address in the input buffer specified by the compress command.

11. The computer system of claim 8, wherein the block I/O device further comprises:
    an output buffer coupled to the controller;
    wherein the controller is configured to store compressed data in the output buffer at an address in the output buffer specified by the compress command.

12. The computer system of claim 8, wherein the block I/O device further comprises:
    programmable circuitry coupled to the controller for compressing the data in accordance with the compression algorithm, the programmable circuitry programmed by the controller in response to the controller retrieving a second command from an administrative submission queue in accordance with the data storage and retrieval protocol.

13. The computer system of claim 12, wherein the programmable circuitry comprises an embedded FPGA.

14. A method for compressing data, performed by a block I/O control device, comprising:
    generating, by a host processor, an compress command, the compress command comprising a modified version of a Vendor Specific Command as defined by an NVMe data storage and retrieval protocol;
    storing, by the host processor, the compress command in a submission queue;
    retrieving, by a controller in an I/O block device coupled to the host processor by a data bus, the compress command from the submission queue in accordance with the NVMe data storage and retrieval protocol;
    retrieving, by the controller, data from an input buffer coupled to the controller at an input buffer address identified by the modified version of the Vendor Specific Command;
    compressing a block of data in accordance with the compress command to generate compressed data, wherein compressing the data comprises:
        retrieving a compression algorithm index value from the modified version of the Vendor Specific Command;
        retrieving a first compression algorithm from a memory coupled to the controller associated with the compression algorithm index value; and
        compressing the block of data using the first compression algorithm;
    and
    storing, by the controller in a completion queue, a result of compressing the data.

15. The method of claim 14, wherein compressing the data further comprises:
    storing, by the controller, the compressed data to an output buffer coupled to the controller at an address in the output buffer specified by the compress command.

16. The method of claim 14, wherein the compression algorithm index value is retrieved from a Namespace ID field defined by the Vendor Specific Command as a field that identifies an area in a memory used to store data.

17. The method of claim 14, wherein compressing the data comprises providing the data to programmable circuitry in the block I/O device, the programmable circuitry programmed by the controller in response to the controller retrieving an administrative command from an administrative submission queue stored in accordance with the NVMe data storage and retrieval protocol.

* * * * *